(12) United States Patent
Choi (10) Patent No.: US 9,684,421 B2
(45) Date of Patent: Jun. 20, 2017

(54) TOUCH SENSING SYSTEM INCLUDING TOUCH SCREEN PANEL

(71) Applicant: LG Display Co., Ltd., Seoul (KR)

(72) Inventor: Jinwook Choi, Seoul (KR)

(73) Assignee: LG Display Co., Ltd., Seoul (KR)

( * ) Notice: Subject to any disclaimer, the term of this patent is extended or adjusted under 35 U.S.C. 154(b) by 27 days.

(21) Appl. No.: 14/813,332

(22) Filed: Jul. 30, 2015

(65) Prior Publication Data

US 2016/0188037 A1    Jun. 30, 2016

(30) Foreign Application Priority Data

Dec. 30, 2014 (KR) ........................ 10-2014-0194432

(51) Int. Cl.
*G06F 3/044* (2006.01)
*G02F 1/1343* (2006.01)

(52) U.S. Cl.
CPC ........ *G06F 3/044* (2013.01); *G02F 1/134309* (2013.01); *G06F 2203/04103* (2013.01)

(58) Field of Classification Search
CPC ........... G06F 3/044; G06F 2203/04103; G02F 1/134309
USPC ........................................................ 345/174
See application file for complete search history.

(56) References Cited

U.S. PATENT DOCUMENTS

| | | | | |
|---|---|---|---|---|
| 8,189,158 B1* | 5/2012 | Kuo | ................... | G02F 1/134309 349/141 |
| 2007/0062739 A1* | 3/2007 | Philipp | ................... | G06F 3/044 178/18.06 |
| 2011/0175671 A1* | 7/2011 | Reynolds | ................ | G06F 3/044 327/517 |
| 2013/0181940 A1* | 7/2013 | Lai | .......................... | G06F 3/044 345/174 |
| 2013/0207924 A1* | 8/2013 | Mohindra | ............... | G06F 3/044 345/174 |
| 2014/0104221 A1* | 4/2014 | Shen | ........................ | G06F 3/044 345/174 |
| 2014/0184945 A1* | 7/2014 | Zhou | ................... | G02F 1/13338 349/12 |
| 2014/0238152 A1* | 8/2014 | Kallassi | ............. | G01R 27/2605 73/862.626 |
| 2014/0354591 A1* | 12/2014 | Chu | ....................... | G06F 3/044 345/174 |
| 2015/0015517 A1* | 1/2015 | Zhao | ....................... | G06F 3/041 345/173 |
| 2016/0041666 A1* | 2/2016 | Lee | ..................... | G02F 1/13338 345/174 |
| 2016/0170517 A1* | 6/2016 | Donnelly | .............. | G06F 3/0412 345/174 |

\* cited by examiner

*Primary Examiner* — Tom Sheng
(74) *Attorney, Agent, or Firm* — Morgan, Lewis & Bockius LLP

(57) ABSTRACT

A display device includes a first electrode arranged in a first direction, and a second electrode arranged in a second direction, wherein the first electrode crosses the second electrode. A base film is between the first electrode and the second electrode, and a driving hole is in one of the first electrode and the second electrode. The driving hole is in a region in which the first electrode overlaps the second electrode, and a side of the driving hole is tilted relative to the first or second direction.

20 Claims, 5 Drawing Sheets

TOUCH SENSING SYSTEM INCLUDING TOUCH SCREEN PANEL

This application claims the priority benefit of Korean Patent Application No. 10-2014-0194432 filed on Dec. 30, 2014, which is incorporated herein by reference for all purposes as if fully set forth herein.

BACKGROUND OF THE INVENTION

Field of the Invention

The present invention relates to a display device and, more particularly, to a display device having a touch sensing system.

Discussion of the Related Art

A variety of types of flat display devices capable of reducing weight and volume (which are disadvantages of the cathode ray tube) are being developed. Such flat display devices may include a liquid crystal display (LCD), a field emission display (FED), a plasma display panel (PDP), and an electroluminescence (EL) device.

It is desirable that portable or mobile devices use display devices that are thin, light, and have low power consumption. Thus, flat display devices are often used as the display means for mobile communication terminals or handheld information processing devices, because they are thin and light in weight.

Furthermore, recent years have seen the research and development of a touch screen panel in which a user inputs information by directly touching a screen using, for example, a finger or conductive substance. The touch screen panel may be advantageous by not necessarily requiring an additional input device, and contents displayed on a screen may be easily and rapidly manipulated through the mere touch of a finger. A touch screen panel having such advantages has been used for various display devices, such as portable information devices (e.g., smart phones), and home appliances (e.g., refrigerators in which display units are formed).

The touch screen panel may be a resistive type, in which metal electrodes are formed in an upper plate or lower plate and a touched location is determined in the form of a voltage gradient according to resistance when a DC voltage is applied, a capacitive type, in which an equipotential is formed in a conductive layer and a touched part is detected by sensing the location where the voltage of an upper/lower plate is changed by a touch, or an electromagnetic type, in which a touched part is detected by reading an LC value induced when an electron pen comes in contact with a conductive layer, depending on a method of detecting a touched part.

The capacitive type touch screen panel may be a self-capacitance type or a mutual capacitance type. In a touch screen panel of a mutual capacitive type, a touch input may be detected by sensing a change in capacitance, e.g., a change in electric charge, when a finger or conductive substance comes in contact with the touch screen panel.

Figure 1:
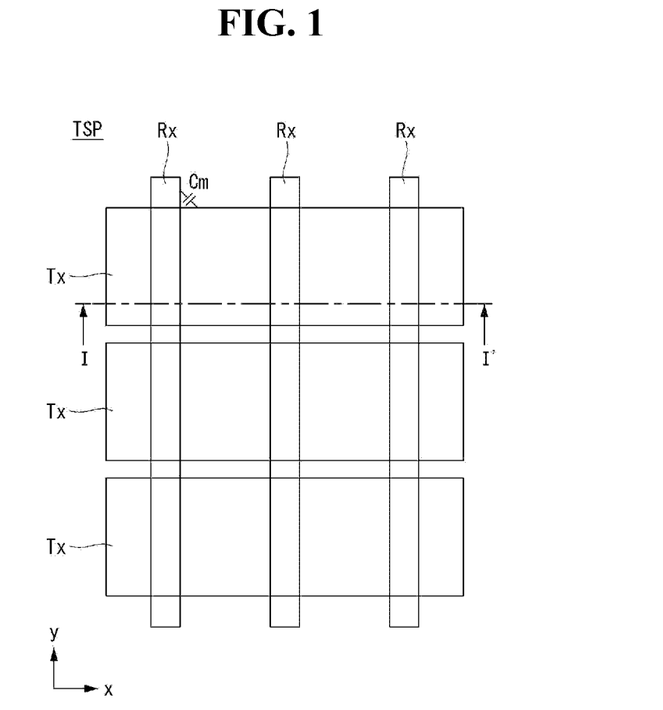
FIG. 1 is a plan view schematically illustrating a mutual capacitance type touch screen panel.

An example mutual capacitance type touch screen panel is described below with reference to FIGS. 1 and 2. FIG. 1 is a plan view schematically illustrating a mutual capacitance type touch screen panel, and FIG. 2 is a schematic cross-sectional view taken along line I-I' of FIG. 1.

Figure 2:
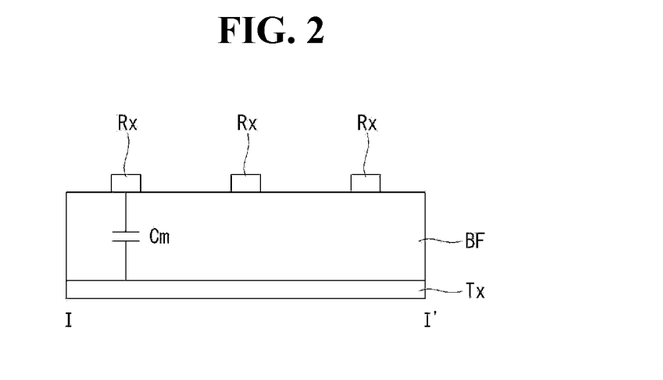
FIG. 2 is a schematic cross-sectional view taken along line I-I' of FIG. 1.

With reference to FIGS. 1 and 2, the mutual capacitance type touch screen panel may include touch driving electrodes Tx, touch sensing electrodes Rx, and a base film BF interposed between the touch driving electrodes Tx and the touch sensing electrodes Rx.

The touch driving electrodes Tx are formed on one surface of the base film BF, and are arranged in parallel in a first direction (e.g., an X-axis direction). The touch sensing electrodes Rx are formed on the other surface of the base film BF, and are arranged in parallel in a second direction (e.g., a Y-axis direction) crossing the touch driving electrodes Tx. The touch driving electrodes Tx and the touch sensing electrodes Rx are arranged to cross each other and are insulated from each other by the base film BF (including an insulating substance) interposed therebetween. The touch driving electrodes Tx and the touch sensing electrodes Rx overlap each other with the base film BF interposed therebetween to form a mutual capacitance Cm.

A sensing method of the mutual capacitance type touch screen panel, configured as described above, is described briefly below. Electric charges are supplied to the mutual capacitance Cm by applying a driving voltage to the touch driving electrodes Tx. In this case, an external touch input can be detected by sensing a change of capacitance through the touch sensing electrodes Rx in synchronization with the driving signal.

In the mutual capacitance type touch screen panel described above, the initial value of the mutual capacitance Cm may be great because the touch driving electrode Tx and the touch sensing electrode Rx have a wide overlap area. If the initial capacitance (Cm) value is great, there may be a problem of it being difficult to distinguish a touch from a non-touch, because a change of capacitance anterior and posterior to a touch is small. Furthermore, if the initial capacitance (Cm) value is great, an RC delay in touch sensing is generated because the time constant is increased. The RC delay may reduce a change of capacitance anterior and posterior to a touch as described above. In order to solve such problems, a sensing frequency may be lowered by taking the RC delay into consideration. However, as the sensing frequency is lowered, there may be a problem in that touch sensitivity is deteriorated because a touch report rate, that is, a rate in which the coordinates of each touch input are transmitted, is decreased.

SUMMARY OF THE INVENTION

An object of the present invention is to provide a touch sensing system capable of reducing initial capacitance by forming driving holes in the touch driving electrodes.

Another object of the present invention is to provide a touch sensing system having improved visibility by forming tilted driving holes in the touch driving electrodes.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

A display device according to an example embodiment includes a first electrode arranged in a first direction and a second electrode arranged in a second direction, wherein the first electrode crosses the second electrode. A base film is between the first electrode and the second electrode, and a driving hole is in one of the first electrode and the second electrode, the driving hole being in a region in which the first electrode overlaps the second electrode. A side of the driving hole is tilted relative to the first or second direction.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

DETAILED DESCRIPTION OF THE EMBODIMENTS

Reference will now be made in detail to embodiments of the invention, examples of which are illustrated in the accompanying drawings. Wherever possible, the same or similar reference numbers will be used throughout the drawings to refer to the same or like parts. Detailed description of known art may be omitted.

First Embodiment

Figure 3:
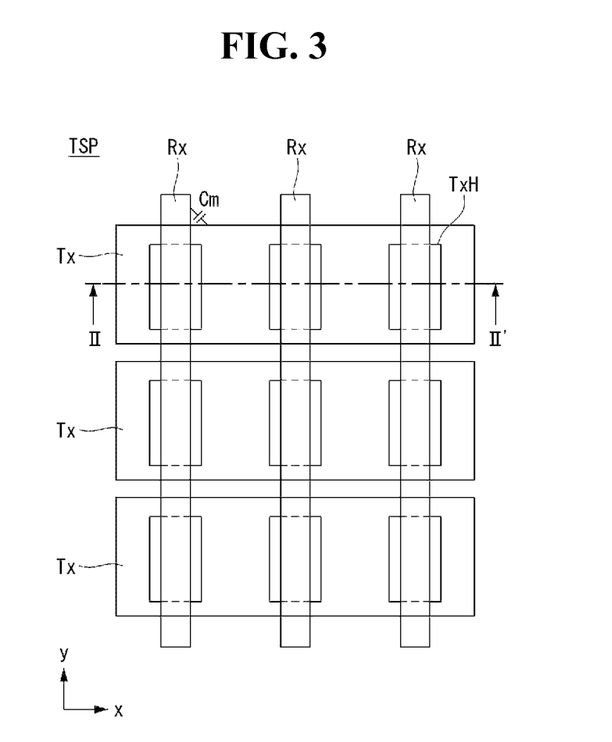
FIG. 3 is a plan view schematically illustrating a mutual capacitance type touch screen panel in accordance with a first embodiment of the present invention.

A mutual capacitance type touch screen panel in accordance with an example of the first embodiment of the present invention is described below with reference to FIGS. 3 and 4. FIG. 3 is a plan view schematically illustrating a mutual capacitance type touch screen panel in accordance with the first embodiment, and FIG. 4 is a schematic cross-sectional view taken along line II-IF of FIG. 3.

Figure 4:
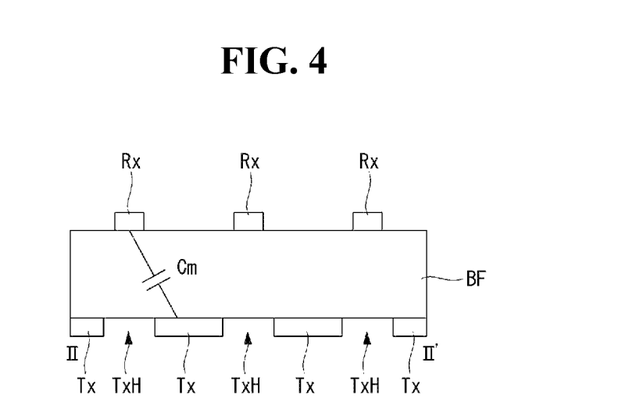
FIG. 4 is a schematic cross-sectional view taken along line II-IF of FIG. 3.

With reference to FIGS. 3 and 4, the touch screen panel TSP of a mutual capacitance type in accordance with an example of the first embodiment of the present invention may include touch driving electrodes Tx, touch sensing electrodes Rx, and a base film BF interposed between the touch driving electrodes Tx and the touch sensing electrodes Rx.

The touch driving electrodes Tx are formed on one surface of the base film BF and are arranged in parallel in a first direction (e.g., an X-axis direction). The touch sensing electrodes Rx are formed on the other surface of the base film BF and are arranged in parallel in a second direction (e.g., a Y-axis direction) crossing the touch driving electrodes Tx. The touch driving electrodes Tx and the touch sensing electrodes Rx are arranged to cross each other with the base film BF, including an insulating substance, interposed therebetween and are thereby insulated from each other. The touch driving electrodes Tx and the touch sensing electrodes Rx overlap with each other with the base film BF interposed therebetween, forming mutual capacitance Cm. In FIG. 3, three touch driving electrodes Tx and three touch sensing electrodes Rx have been illustrated as formed to cross each other, but embodiments of the present invention are not limited thereto. For example, one or more touch driving electrodes Tx and one or more touch sensing electrodes Rx may be included.

The touch driving electrode Tx and the touch sensing electrode Rx forming the touch screen panel may be electrically connected to different electrode lines (not illustrated). For example, the touch driving electrode Tx may be electrically connected to one side of a first electrode line, and the touch sensing electrode Rx may be electrically connected to one side of a second electrode line. The other side of each of the first electrode line and the second electrode line may be electrically connected to a driving unit (e.g., a flexible printed circuit (FPC) or a chip on film (COF), not illustrated) including a touch control unit (not illustrated) for driving and controlling the touch screen panel.

In the mutual capacitance type touch screen panel configured as described above, a touch input may be sensed by supplying a driving signal from a driving unit to the touch driving electrode Tx through the first electrode line so that electric charges are supplied to mutual capacitance Cm, and sensing a change of capacitance through the second electrode line and the touch sensing electrode Rx in synchronization with the driving signal.

The touch driving electrode Tx and the touch sensing electrode Rx may include a transparent conductive substance, such as indium tin oxide (ITO) or indium zinc oxide (IZO). The base film BF has a transparent dielectric film type, and may be made of polyethylene terephthalate (PET), polycarbonate (PT), polyimide (PI), acryl, or polyethylene naphthalate (PEN).

A driving hole TxH is formed in the touch driving electrode Tx in a region in which the touch driving electrode Tx overlaps with the touch sensing electrode Rx. The driving hole TxH may be formed in one or more of regions in which the touch driving electrodes Tx overlap with the touch sensing electrodes Rx. The formed driving holes TxH may be spaced apart from each other at a specific interval. Although not illustrated, the driving hole TxH may be formed in a wide range on the touch driving electrode Tx in regions in which one touch driving electrode Tx overlaps with a plurality of the touch sensing electrodes Rx.

As the size of the driving hole TxH formed in the touch driving electrode Tx increases, initial capacitance Cm may be reduced because an overlap area between the touch driving electrode Tx and the touch sensing electrode Rx is reduced. However, if the size of the driving hole TxH increases, there may be a problem in that resistance of the touch driving electrode Tx may rise. Accordingly, the size of the driving hole TxH may be determined by design, taking into consideration a reduction of the initial capacitance Cm and an increase of resistance.

When the driving hole TxH is formed in the touch driving electrode Tx, the initial capacitance Cm is reduced because an overlap area between the touch driving electrode Tx and the touch sensing electrode Rx is reduced. If the initial capacitance Cm is reduced, whether a touch is present may be more rapidly detected because an increase of a time constant may be prevented. That is, in an example of the first embodiment of the present invention, a sensing frequency can be increased because the initial capacitance Cm is lowered. If the sensing frequency is increased, touch sensitivity is improved because a touch report rate, that is, a rate in which the coordinates of each touch input are transmitted, is increased. Accordingly, examples of the first embodiment of the present invention may provide the touch screen panel having an improved touch recognition ratio.

Second Embodiment

Figure 5:
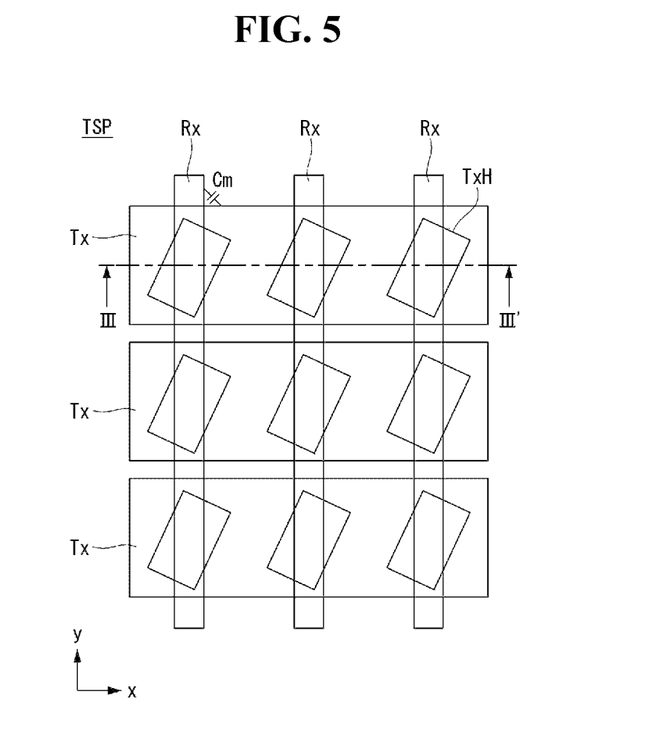
FIG. 5 is a plan view schematically illustrating a mutual capacitance type touch screen panel in accordance with a second embodiment of the present invention.
Figure 6:
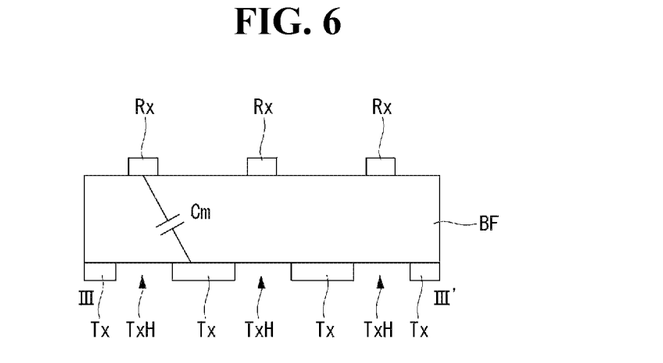
FIG. 6 is a schematic cross-sectional view taken along line III-III' of FIG. 5.
Figure 7:
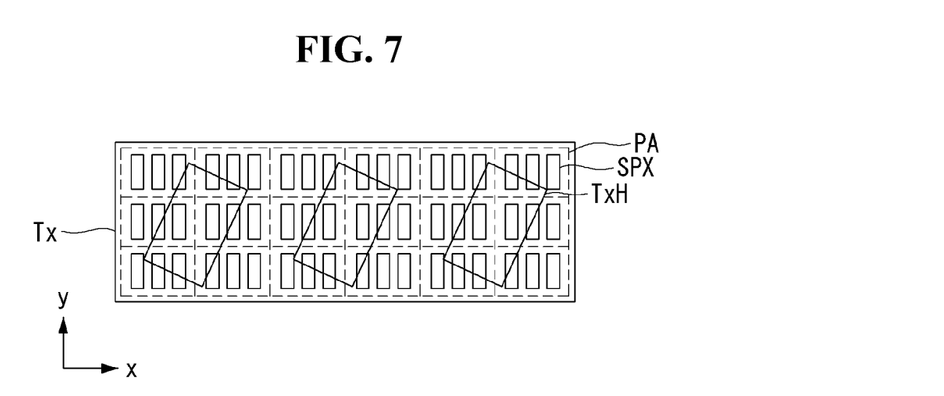
FIG. 7 is a plan view schematically illustrating a touch driving electrode illustrated in FIG. 5 and pixel regions corresponding to the touch driving electrode.
Figure 8:
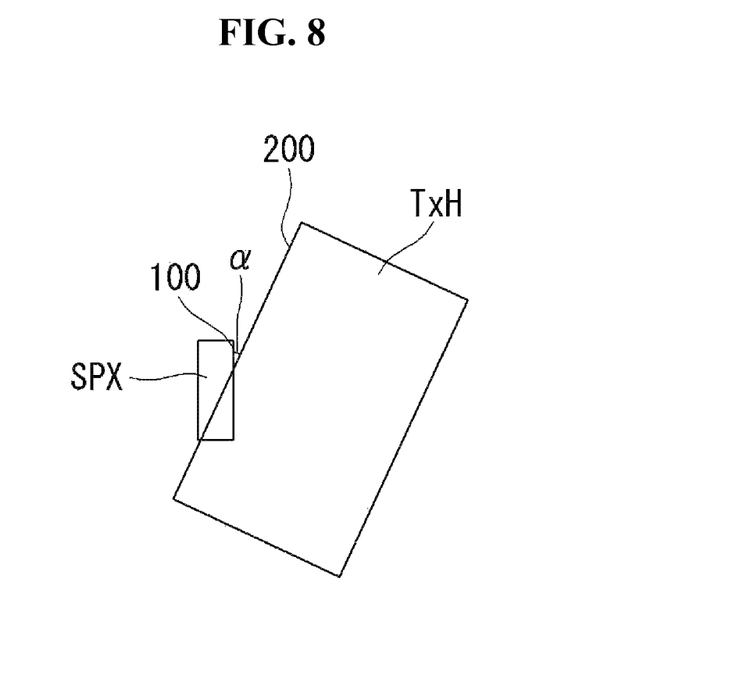
FIG. 8 is a diagram illustrating the relation between a driving hole formed in the touch driving electrode and a sub-pixel.

A mutual capacitance type touch screen panel in accordance with a second embodiment of the present invention is described below with reference to FIGS. 5 to 8. FIG. 5 is a plan view schematically illustrating the mutual capacitance type touch screen panel in accordance with a second embodiment of the present invention. FIG. 6 is a schematic cross-sectional view taken along line III-III' of FIG. 5. FIG. 7 is a plan view schematically illustrating one touch driving electrode illustrated in FIG. 5 and a pixel region corresponding to the touch driving electrode. FIG. 8 is a diagram illustrating the relation between a driving hole formed in the touch driving electrode and a sub-pixel.

With reference to FIGS. 5 and 6, the touch screen panel TSP of a mutual capacitance type in accordance with the second embodiment of the present invention may include touch driving electrodes Tx, touch sensing electrodes Rx, and a base film BF interposed between the touch driving electrodes Tx and the touch sensing electrodes Rx.

The touch driving electrodes Tx are formed on one surface of the base film BF and are arranged in parallel in a first direction (e.g., an X-axis direction). The touch sensing electrodes Rx are formed on the other surface of the base film BF and are arranged in parallel in a second direction (e.g., a Y-axis direction) crossing the touch driving electrodes Tx. The touch driving electrodes Tx and the touch sensing electrodes Rx are arranged to cross each other with the base film BF, including an insulating substance, interposed therebetween, and are thereby insulated from each other. The touch driving electrodes Tx and the touch sensing electrodes Rx overlap with each other with the base film BF interposed therebetween, forming mutual capacitance Cm. In FIG. 5, three touch driving electrodes Tx and three touch sensing electrodes Rx have been illustrated as being formed to cross each other, but embodiments of the present invention are not limited thereto. For example, one or more touch driving electrodes Tx and one or more touch sensing electrodes Rx may be included.

The touch driving electrode Tx and the touch sensing electrode Rx forming the touch screen panel may be electrically connected to different electrode lines (not illustrated). For example, the touch driving electrode Tx may be electrically connected to one side of a first electrode line, and the touch sensing electrode Rx may be electrically connected to one side of a second electrode line. The other sides of each of the first electrode line and the second electrode line may be electrically connected to a driving unit (e.g., a flexible printed circuit (FPC) or a chip on film (COF), not illustrated) including a touch control unit (not illustrated) for driving and controlling the touch screen panel.

In the mutual capacitance type touch screen panel configured as described above, a touch input may be sensed by supplying a driving signal from a driving unit to the touch driving electrode Tx through the first electrode line so that electric charges are supplied to mutual capacitance Cm, and sensing a change of capacitance through the second electrode line and the touch sensing electrode Rx in synchronization with the driving signal.

The touch driving electrode Tx and the touch sensing electrode Rx may include a transparent conductive substance, such as indium tin oxide (ITO) or indium zinc oxide (IZO). The base film BF has a transparent dielectric film type, and may be made of polyethylene terephthalate (PET), polycarbonate (PT), polyimide (PI), acryl, or polyethylene naphthalate (PEN).

A driving hole TxH is formed in the touch driving electrode Tx in a region in which the touch driving electrode Tx overlaps with the touch sensing electrode Rx. The driving hole TxH may be formed in one or more regions in which the touch driving electrodes Tx overlap with the touch sensing electrodes Rx. The formed driving holes TxH may be spaced apart from each other at a specific interval. Although not illustrated, the driving hole TxH may be formed in a wide range on the touch driving electrode Tx in regions in which one touch driving electrode Tx overlaps with a plurality of the touch sensing electrodes Rx.

An example relation between the touch driving electrode Tx and sub-pixels formed in pixel regions is described below with reference to FIG. 7. FIG. 7 is a plan view schematically illustrating one touch driving electrode of FIG. 5 and pixel regions corresponding to the touch driving electrode. In FIG. 7, seven pixel regions PA in width and three pixel regions PA in height have been illustrated as corresponding to one touch driving electrode Tx, but embodiments of the present invention are not limited thereto. This is merely an example for illustration purposes.

A display panel DP (as illustrated by the example in FIGS. 9 and 10), to be described later, is disposed under the touch screen panel. The pixel regions PA are defined in the display panel DP. Red, green, and blue; or red, green, blue, and white sub-pixels SPX are formed in the pixel region PA. Each of the sub-pixels SPX may be partitioned by a pixel definition layer (e.g., a bank). Each sub-pixel SPX emits light of a color to be implemented. The sides of each of the partitioned sub-pixels SPX may be vertical or horizontal to an X-axis or Y-axis.

Examples of the second embodiment of the present invention may differ from the first embodiment in the shape of the driving hole TxH. In the second embodiment of the present invention, any one side of the driving hole TxH may be tilted at a specific angle based on any one side of the partitioned sub-pixel SPX. That is, any one side of the driving hole TxH may be formed to have a tilt angle (or dutch angle) that does not align vertically or horizontally with respect to any one side of the partitioned sub-pixel SPX. Accordingly, the driving hole TxH is formed to cross the partitioned sub-pixels SPX in a diagonal direction.

For example, with reference to FIG. 8, the first side 200 of the driving hole TxH may be formed to have an angle $\alpha$ to the first side 100 of the partitioned sub-pixel SPX. The angle $\alpha$ formed by the first side 200 of the driving hole TxH and the first side 100 of the sub-pixel SPX may have a range of $0°<\alpha<90°$, $90°<\alpha<180°$, $180°<\alpha<270°$, and $270°<\alpha<360°$. In an example embodiment, the angle $\alpha$ may have a range of $5°<\alpha<10°$. For example, the angle $\alpha$ may have an angle of 7°.

For convenience of description, the sides of the partitioned sub-pixel SPX have been illustrated as being vertical or horizontal to the X-axis or the Y-axis, but the sides of the partitioned sub-pixel SPX may be formed to have a tilt angle (or dutch angle) relative to the X-axis or the Y-axis.

Light incident on a touch screen panel from a display panel passes through the touch screen panel, and is recognized by a user. In this case, if the driving hole TxH has been formed in the touch driving electrode Tx, a difference in luminance is generated between the region in which the driving hole TxH has been formed and a region in which the driving hole TxH has not been formed. For example, if the touch driving electrode Tx has been made of ITO, a difference in luminance attributable to a difference in transmittance is generated in the region of the driving hole TxH from which ITO has been removed and in the remaining ITO regions because ITO light transmittance is about 90%. Furthermore, a difference in luminance may be recognized at the boundary part of the driving hole TxH. Such a difference in luminance may be recognized as a spot by a user, thereby deteriorating display quality of a display device. For example, if the boundary of the sub-pixel SPX overlaps with the boundary of the driving hole TxH, the boundary of the driving hole TxH may be recognized by a user.

In the touch screen panel in accordance with the second embodiment of the present invention, the driving hole TxH formed in the touch driving electrode Tx is tilted at a specific angle based on the sides of each of the sub-pixels SPX. That is, when viewed on a plane, the boundary of the driving hole TxH is formed to penetrate the sub-pixels SPX in a diagonal direction so that it does not overlap with the boundary of the sub-pixel SPX. Accordingly, the recognition of the boundary of the driving hole TxH by a user can be reduced. The second embodiment of the present invention may provide the touch sensing system having improved visibility and display quality while reducing the initial capacitance Cm, because the tilted driving hole TxH is formed in the touch driving electrode Tx so that the boundary of the driving hole TxH is not recognized by a user.

Figure 9:
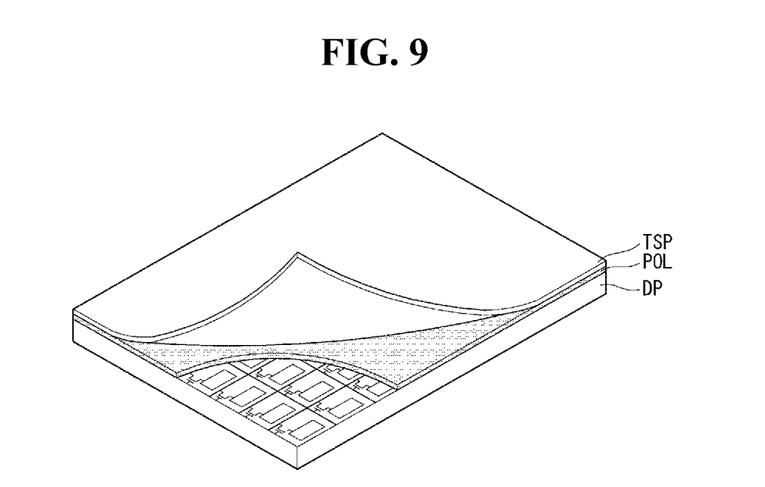
FIGS. 9 and 10 are diagrams illustrating various combinations of a touch screen panel and a display panel in accordance with example embodiments of the present invention.
Figure 10:
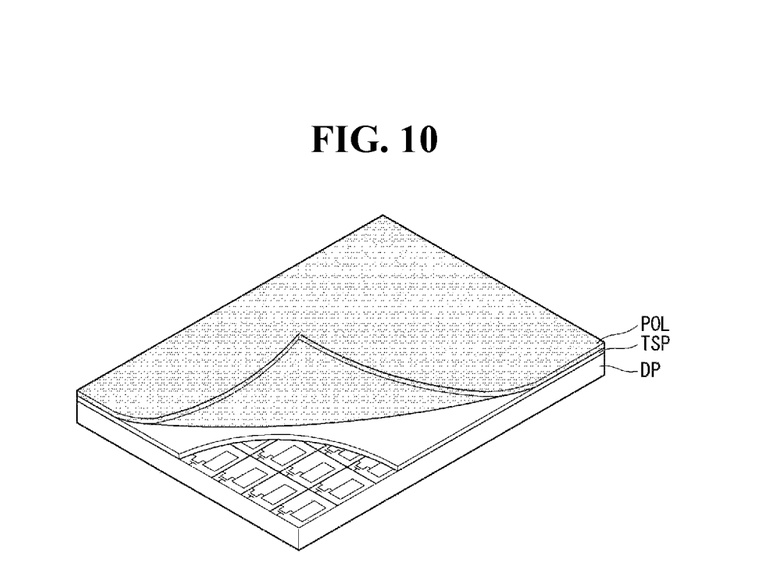

FIGS. 9 and 10 are diagrams illustrating examples of various combinations of a touch screen panel and a display panel in accordance with embodiments of the present invention.

The display panel DP is disposed under the touch screen panel TSP in accordance with an embodiment of the present invention. A polarization plate POL may be disposed between the touch screen panel TSP and the display panel DP, as illustrated in FIG. 9. Or the polarization plate POL may be disposed over the touch screen panel TSP, as illustrated in FIG. 10. The touch screen panel TSP, the display panel DP, and the polarization plate POL may be bonded together using an adhesive, such as a pressure sensitive adhesive (PSA). Accordingly, the touch sensing system in accordance with an embodiment of the present invention may be completed.

The display panel DP may be implemented based on a flat display device, such as a liquid crystal display (LCD) or an organic light emitting display (OLED). For example, if the display panel DP is implemented based on an OLED, the display panel DP may include a substrate in which pixel regions are defined, a thin film transistor formed on the substrate, and an OLED connected to the thin film transistor. Sub-pixels emitting red, green, and blue; or red, green, blue, and white are disposed in the pixel region. The thin film transistor may be disposed in each of the sub-pixels. The thin film transistor is connected to the OLED including an emission layer on which an emission substance is coated and a cathode electrode and anode electrode disposed to overlap with each other with the emission layer interposed therebetween. An encapsulation layer for protecting internal elements from moisture and oxygen may be further formed on the substrate including the OLED.

It will be apparent to those skilled in the art that various modifications and variations can be made in the display device of the present invention without departing from the spirit or scope of the invention. Thus, it is intended that the present invention cover the modifications and variations of this invention provided they come within the scope of the appended claims and their equivalents.

What is claimed is:
1. A display device, comprising:
a first electrode in a first direction;
a second electrode in a second direction, wherein the first electrode crosses the second electrode;
a base film between the first electrode and the second electrode;
a driving hole in one of the first electrode and the second electrode, the driving hole in a region in which the first electrode overlaps the second electrode,
wherein a side of the driving hole is tilted relative to the first or second direction, and
wherein the first electrode is a touch driving electrode and the second electrode is a touch sensing electrode, the display device configured to sense a touch by driving the first electrode and sensing a change of capacitance on the second electrode.
2. The display device of claim 1, wherein the driving hole is in a region in which the first electrode overlaps with the second electrode in plan view.
3. The display device of claim 1, wherein the display device further comprises a subpixel; and
the side of the driving hole is tilted relative to a side of the subpixel.
4. The display device of claim 3, wherein the boundary of the driving hole penetrates the subpixel in a diagonal direction, whereby the boundary of the driving hole does not overlap the boundary of the subpixel.
5. The display device of claim 3, wherein the side of the driving hole is tilted relative to the side of the subpixel by 5° to 10°.
6. The display device of claim 5, wherein the side of the driving hole is tilted relative to the side of the subpixel by 7°.
7. The display device of claim 1, wherein the display device comprises a display panel and a touch panel, the display panel disposed under the touch screen panel relative to the touch.
8. The display device of claim 1, wherein the driving hole is in the first electrode.
9. The display device of claim 1, wherein the first electrode and the second electrode each comprise a transparent conductive substance including indium tin oxide (ITO) or indium zinc oxide (IZO).
10. The display device of claim 1, wherein the base film comprises a transparent dielectric film including polycarbonate (PC), polyethylene terephthalate (PET), polyimide (PI), acryl, or polyethylene naphthalate (PEN).
11. A display device, comprising:
a first electrode in a first direction;
a second electrode in a second direction, wherein the first electrode crosses the second electrode;
a base film between the first electrode and the second electrode;
a driving hole in one of the first electrode and the second electrode, the driving hole in a region in which the first electrode overlaps the second electrode,
wherein a side of the driving hole is tilted relative to the first or second direction, and wherein the first and second electrodes are touch electrodes.

12. The display device of claim 11, wherein the first electrode is a touch driving electrode and the second electrode is a touch sensing electrode, the display device configured to sense a touch by driving the first electrode and sensing a change of capacitance on the second electrode.

13. The display device of claim 11, wherein the driving hole is in a region in which the first electrode overlaps with the second electrode in plan view.

14. The display device of claim 11, wherein the display device further comprises a subpixel; and
the side of the driving hole is tilted relative to a side of the subpixel.

15. The display device of claim 14, wherein the boundary of the driving hole penetrates the subpixel in a diagonal direction, whereby the boundary of the driving hole does not overlap the boundary of the subpixel.

16. The display device of claim 14, wherein the side of the driving hole is tilted relative to the side of the subpixel by 5° to 10°.

17. The display device of claim 16, wherein the side of the driving hole is tilted relative to the side of the subpixel by 7°.

18. The display device of claim 11, wherein the display device comprises a display panel and a touch panel, the display panel disposed under the touch screen panel relative to the touch.

19. The display device of claim 11, wherein the driving hole is in the first electrode.

20. The display device of claim 11, wherein the first electrode and the second electrode each comprise a transparent conductive substance including indium tin oxide (ITO) or indium zinc oxide (IZO).

* * * * *